United States Patent [19]

Giordano et al.

[11] Patent Number: 4,609,587
[45] Date of Patent: Sep. 2, 1986

[54] RETROREFLECTIVE MATERIALS AND USE

[75] Inventors: John J. Giordano, Belleville; Jeffrey P. Shawcross, Phillipsburg; Alfred E. Fuchs, Denville; Robert Dejaiffe, Oak Ridge, all of N.J.

[73] Assignee: Potters Industries, Inc., Hasbrouck Heights, N.J.

[21] Appl. No.: 676,820

[22] Filed: Nov. 30, 1984

[51] Int. Cl.$^4$ ............................................. B32B 5/16
[52] U.S. Cl. .................................... 428/325; 350/105; 428/402; 428/406; 428/447
[58] Field of Search ................... 427/163, 219, 221; 428/212, 213, 406, 447, 325; 350/105

[56] References Cited

U.S. PATENT DOCUMENTS

| | | | |
|---|---|---|---|
| 4,023,889 | 5/1977 | Eagon et al. | 427/163 |
| 4,025,674 | 5/1977 | Mizuochi | 427/163 |
| 4,075,049 | 2/1978 | Wood | 427/163 |
| 4,104,102 | 8/1978 | Eagon et al. | 427/163 |
| 4,117,192 | 9/1978 | Jorgenson | 427/163 |
| 4,265,937 | 5/1981 | Hameya et al. | 427/163 |
| 4,265,938 | 5/1981 | Jack et al. | 427/163 |
| 4,299,874 | 11/1981 | Jones et al. | 428/913 |
| 4,418,110 | 11/1983 | May et al. | 428/913 |
| 4,447,495 | 5/1984 | Engle | 428/406 |

Primary Examiner—James J. Bell
Attorney, Agent, or Firm—Lee C. Robinson, Jr.

[57] ABSTRACT

Retroreflective materials are made by coating glass particles with both hydrophobic polymers and coupling agents or with siloxane compounds which have both hydrophobic side chains and coupling-type side chains capable of chemically bonding to, or of forming loose associations with, a wide variety of materials.

7 Claims, 2 Drawing Figures

RETROREFLECTIVE MATERIALS AND USE

BACKGROUND OF THE INVENTION

The invention relates to retroreflective particles for providing increased nighttime visibility of highway markings, signs and other surfaces where retroreflectivity is desired. The invention further relates to processes for the preparation of such particles and for their use.

The invention, while of general application, is particularly effective in adding retroreflectivity to roadway markings such that nighttime visibility of such markings is greatly improved. It is known that glass particles greatly increase the visibility of painted markings on roadway surfaces and other painted surfaces when the glass particles are evenly dispersed into the painted surface. However, evenly dispersing glass particles into a painted surface can be difficult unless the particles are free flowing. Because the particles used are typically so small as to have a powdery appearance, small amounts of moisture can cause the particles to agglomerate and lose important free-flowing properties. Even high relative humidity or condensation on the particle surfaces caused by temperature changes can provide sufficient moisture to cause agglomeration and to interfere with flow properties.

Agglomeration can be significantly reduced by applying hydrophobic coatings to the surface of the glass particles. These coatings reduce surface energy on the glass and keep water from binding particles to one another. A problem with hydrophobically coated particles, and to a significant degree with uncoated particles, is an inability of the particles to firmly bind the paints or other materials into which they are placed. Thus increased visibility imparted by hydrophobically coated glass particles can be short-lived due to a steady loss of the glass particles as they are loosened and removed by friction, weather changes and other physical factors.

The loss of glass particles can be slowed by coating the particles with thin layers of certain coupling agents selected for their ability to provide positive adhesion between the particles and surrounding materials. Known coupling agents however reduce the retroreflectivity of glass particles by causing a process known as "wicking" by which paints are drawn onto the glass surface and coat too much of the surface area for sufficient retroreflectivity to be achieved. Although normal road abrasion wears away some of the paint which results from wicking, retroreflectivity never becomes ideal, and in any event is diminished for an undesirably long period of time after the glass is placed. Additionally, known coupling agents are not hydrophobic and particles coated therewith are subject to moisture induced agglomeration with all of the attendant difficulties described above.

It is accordingly an object of the present invention to provide materials capable of producing optimal retroreflectivity which are resistant to agglomeration even under moist conditions, and which will additionally exhibit improved adhesion to surfaces to which they are applied.

It is a further object to provide retroreflective materials which are functional and effective shortly after application.

Still another object is to provide retroreflective materials which are long-lasting, durable, economical and thoroughly reliable in use.

SUMMARY

The retroreflective particles of the present invention are glass or other inorganic particles coated with a composition capable of providing water-resistance, wicking-resistance and strong positive adhesion between the particles and surfaces on which the particles are placed. The coating will typically include hydrophobic polymers to which coupling agents have been added. A hydrophobic polymer coating will act to prevent agglomeration and reduce unnecessary wicking. The addition of known coupling agents provides positive adhesion between the particles and surfaces on which the particles are placed, and causes a desirable yet unexcessive degree of wicking to help hold the particles firmly in place on painted surfaces.

It is desirable to add the hydrophobic polymers such as those containing fluoro- or chloro-hydrocarbon substituents to the particles before adding coupling agents. Coupling agents are preferably added second while the particles are undergoing substantial agitation. Then the particles are desirably heated to drive off water and other solvents. Chlorinated hydrocarbons are particularly good solvents for use in coating the particles.

A particularly preferred coating in accordance with the instant invention may be formed by cross-linking various compounds selected from the group consisting of silane monomers and siloxanes, some of which compounds have hydrophobic side chains to suppress wicking and others of which have coupling-type side chains to improve bonding capacity. The term "coupling-type side chains" refers to silane or siloxane substituents which are relatively reactive and capable of forming chemical bonds or loose associations with a large number of materials.

The ratio of silane or siloxane starting compounds having hydrophobic substituents to those having coupling-type substituents may vary in accordance with the use which will be made of the final product. Where excessive wear and tear on coated particles is to be expected, a coating made from a higher ratio of coupling-type starting compounds is desirable. Conversely, where wear and tear is expected to be light or where coated particles are likely to be subjected to considerable moisture, a higher ratio of starting compounds with hydrophobic substituents will be desirable. In a preferred embodiment of the invention, the ratio of hydrophobic starting compounds to coupling-type starting compounds will range from 3:1 to 1:3.

Some preferred hydrophobic starting compounds are those of the general formula:

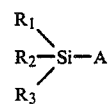

wherein $R_1$, $R_2$ and $R_3$ may be the same or different and denote hydrogen, hydroxy, methoxy, alkoxy or substituted alkoxy; and wherein A denotes any non-polar side chain such as a saturated hydrocarbon.

Some preferred coupling-type starting compounds are those of the general formula:

wherein $R_1$, $R_2$ and $R_3$ may be the same or different and denote hydrogen, hydroxy, methoxy, alkoxy, or substituted alkoxy; and wherein B denotes a coupling-type side chain such as a hydrocarbon having a terminal quaternary ammonia, terminal amine, or terminal diamine, or such as an unsaturated hydrocarbon like vinyl acrylate.

Solutions of the selected starting compounds are added to samples of particles by known methods, preferably in the presence of a suitable catalyst for enhancing cross-linking reactions. This results in particles with thin cross-linked siloxane coatings which simultaneously enhance the retroreflectivity, bonding ability, and water resistance of the particles.

In a preferred embodiment of the invention, glass spheres coated with the above siloxane composition are thoroughly intermixed with larger glass spheres coated exclusively or primarily with coupling agents. In such an embodiment, the smaller glass spheres are the primary providers of improved retroreflectivity, while the larger glass spheres, by absorbing much of the force exerted by physical factors such as vibration and friction, protect the smaller spheres from being loosened and removed.

The present invention, as well as further objects and advantages thereof, will be more fully understood from the following description of certain preferred embodiments, when read with reference to the accompanying drawings.

DESCRIPTION OF CERTAIN PREFERRED EMBODIMENTS

Figure 1:
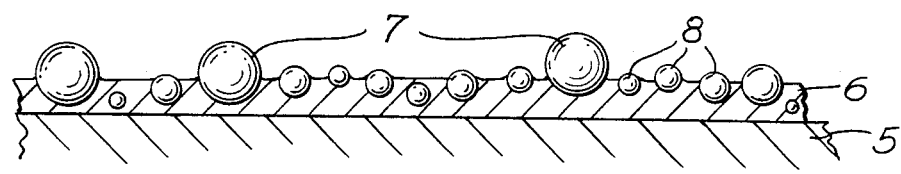
FIG. 1 is a vertical sectional view of a highway or other painted surface having glass particles of various sizes randomly dispersed in the paint in accordance with an illustrative embodiment of the invention.

Referring to FIG. 1 of the drawings, there is shown a surface 5 having thereon a layer of paint 6 into which is randomly dispersed a plurality of glass particles 7 and 8, wherein the average particle size of particles 7 is greater than that of particles 8.

Figure 2:
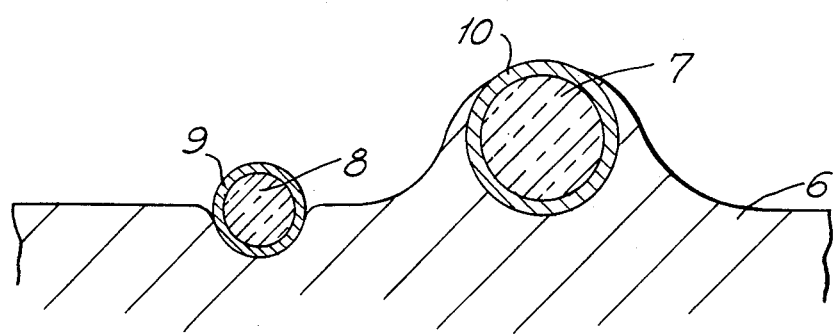
FIG. 2 is an enlarged fragmentary vertical sectional view of the particles contrasting the wicking of paint onto the surface of a large glass particle, as occurs when such a particle is coated primarily or completely by a coupling agent, to the lack of wicking for a smaller glass particle, as occurs when such a particle is coated solely or primarily by a hydrophobic agent.

Referring to FIG. 2 there is shown a glass particle 8 coated with a siloxane compound 9 which siloxane compound has both hydrophobic and coupling-type side chains. Paint 6 does not coat much of the upper half of glass particle 8 due to the effects of siloxane compound 9. A larger glass particle 7 randomly placed in paint 6 near particle 8 is coated with a siloxane coupling agent 10 having primarily or exclusively coupling-type side chains capable of chemically bonding to, or of forming loose associations with, a wide variety of materials. Coupling agent 10 causes paint 6 to wick up onto much of the upper surface of glass particle 7 causing particle 7 to become firmly attached to the paint.

The larger spheres shown in FIGS. 1 and 2 absorb much of the force which might otherwise be exerted on the smaller spheres by various sources such as roadway traffic. Where these large spheres are coated with coupling agents they are better able to absorb this force without being loosened or removed. Neighboring small particles protected by the large particles can be coated with coating agents designed to optimize retroreflectivity with lesser concern for adhesiveness. A completely hydrophobic coating can be used on the smaller spheres, but because some degree of wicking can be helpful in optimizing retroreflectivity, a siloxane coating having both coupling-type and hydrophobic sidechains is preferred.

The small glass particles are preferably spherically shaped and range in size from 6 to 3,000 microns in diameter. These are produced and collected by known methods. The glass spheres so collected are then treated with various silane and siloxane reactants including both those with hydrophobic side chains and those with coupling-type side chains.

Especially preferred hydrophobic silanes and siloxanes include but are not limited to methyl hydrogen siloxane, octadecyl trimethoxy silane, and other trimethoxy silanes with non-polar side chains.

An especially preferred coupling-type silane is vinyl trimethoxy silane. A desired coating results from adding approximately 50% by weight of hydrophobic type starting compounds and approximately 50% by weight of coupling-type starting compounds.

It is also desirable to add a Lewis base to catalyze hydrolyzation of the starting materials and to further catalyze a condensation reaction by which the hydrolyzed starting materials become cross-linked into a desired siloxane coating. These reactions are believed to proceed analogously to the exemplary equations shown below which by way of illustration use monomeric silanes as starting compounds:

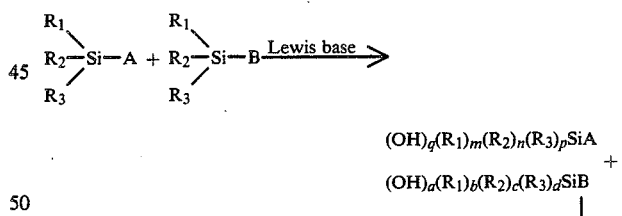

Wherein A, B, $R_1$, $R_2$, $R_3$ are as previously defined; wherein b, c, d, m, n and p are either 0 or 1 and may be the same or different; wherein a and q are either 1, 2 or 3 and may be the same or different; and wherein the sum of a, b, c, d or of q, m, n, p is 3.

It is desirable that the above reactions produce primarily a cross-linked product rather than a linearly-linked product as this is more conducive to limiting the film of coating agent on the glass spheres to a desired thickness of not appreciably more than one molecular layer. For this reason it is preferable that $R_1$, $R_2$ and $R_3$ be relatively small substituents. Otherwise, steric hindrances tend to disfavor the cross-linked product relative to the linearly linked product. It is also helpful in assuring a sufficiently thin coating to carefully monitor the concentration of the reactants in solution and to also carefully monitor the amount of solution added to a given quantity of glass spheres. It is preferred that approximately 0.2 grams of reactants be applied for each kilogram of glass spheres to be coated. This ratio can be varied greatly within the scope of the invention, and preferred ratios will vary with the size and surface area of particles to be coated.

A preferred apparatus for applying to glass spheres the reactants which form desired siloxane coatings is taught in U.S. Pat. No. 3,130,070. The apparatus of that patent advances particles at a substantially constant rate through a region where coating reactants are applied. This constant advancement is particularly desirable to the process of the instant invention in that the ratio of coating reactants to glass spheres can be maintained at desired levels by coordinating the rate of application of coating reactants to the rate of advancement of the glass spheres.

At some point before or immediately after the coating reactants are applied to the glass spheres, it is preferable to add a Lewis base as a catalyst.

After glass spheres are coated with the siloxane products which result from a cross linking reaction involving the applied reactants, they are preferably cured until free-flowing. In a free-flowing state they can be easily applied to numerous surfaces where retroreflectivity is desired, for instance into wet paint which has recently been applied to form highway road markings.

It is desirable, though not necessary, to add spheres having larger average diameters than those prepared above, which larger spheres have been coated completely or primarily with coupling agents. The larger particles, when applied as part of a mixture containing the smaller particles, are especially helpful in absorbing much of the wear and tear that would otherwise loosen and remove the smaller particles.

EXAMPLES

EXAMPLE 1

Glass spheres ranging in size from 6 to 3,000 microns in diameter are produced and collected by known methods. The glass spheres are introduced into an apparatus similar to that taught in U.S. Pat. No. 3,130,070. The beads are advanced through this apparatus at a constant rate into an area where they are amassed and subjected to substantial agitation beneath the surface. While in this agitation area, the beads are treated in the presence of a Lewis base with dilute solutions of methyl hydrogen siloxane, trimethoxy butyl amine, and octadecyl trimethoxy silane. All of the added solutions are introduced at a rate which is correlated to the rate of advancement of the spheres such that approximately 0.2 grams of solution is applied to each kilogram of glass spheres. The glass spheres are then advanced out of the coating apparatus and are cured until free-flowing. The treated beads are then dispersed in wet paint just after the paint is applied to highway surfaces. Together with the paint, the particles act as road markings which are highly visible at night due to the glass spheres' ability to reflect oncoming headlights.

EXAMPLE 2

Coated glass spheres are prepared as in Example 1 wherein the dilute solutions introduced to the glass spheres during agitation are solutions of octadecyl trimethoxy silane, trimethoxy butyl amine, and vinyl trimethoxy silane. A separate sample of larger spheres having diameters in excess of 3,000 microns are prepared and coated only with vinyl trimethoxy silane coupling agent. After curing, this sample of larger spheres is mixed into the original spheres and known mechanical means are used to achieve a uniform mixture. This resulting mixture of spheres is used to add retroreflectivity to painted highway markings in areas where excessive wear and tear is expected.

The above examples are set forth in illustration of this invention and should not be construed as limitations thereof. The terms and expressions employed are used as terms of description and not as terms of limitation. There is no intention, in the use of such terms and expressions, of excluding any equivalents of the features described or portions thereof, it being recognized that various modifications are possible within the scope of the invention claimed.

We claim:

1. Retroreflective materials comprised of glass particles coated with a siloxane compound having some side chains which are hydrophobic and having other coupling-type side chains which are capable of forming chemical bonds to, or loose associations with, a wide variety of materials.

2. Retroreflective materials comprised of a uniform mixture of:
    (1) a first group of circular retroreflective glass particles coated with a siloxane compound having some side chains which are hydrophobic and having other coupling-type side chains which are capable of forming chemical bonds to, or loose associations with, a wide variety of materials; and
    (2) a second group of circular retroreflective glass particles having average particle size larger than those of the first group, all of which are coated with agents having coupling-type side chains capable of forming chemical bonds to, or loose associations with, a wide variety of materials.

3. Retroflective materials comprised of glass particles coated with a siloxane compound which is the condensation product of two or more reactants selected from the group consisting of silane monomers and siloxanes, wherein at least one reactant has one or more hydrophobic side chains, and wherein at least one other reactant has one or more coupling-type side chains capable of forming chemical bonds to, or loose associations with, a wide variety of materials.

4. Retroreflective materials as in claim 1 wherein the glass particles range in size between approximately 6 and 3,000 microns in diameter.

5. Retroreflective materials as in claim 2 wherein the circular glass particles of the first group range in size between approximately 6 and 3,000 microns in diameter and wherein most of the glass particles of the second group have diameters larger than 3,000 microns.

6. Retroreflective materials comprised of a uniform mixture of
    (1) a first group of glass particles coated with siloxane compounds having exclusively or primarily hydrophobic side chains; and (2) a second group of glass particles coated with siloxane compounds having exclusively or primarily coupling-type side chains capable of chemically bonding to, or of forming loose associations with, a wide variety of materials, wherein the particles of the second group have a larger average particle size than do those of the first group.

7. Retroreflective materials comprised of a uniform mixture of glass beads from:

a first group of glass beads coated with siloxane compounds exclusively or primarily hydrophobic side chains; and a second group of glass beads coated with siloxane compounds having exclusively or primarily coupling-type side chains capable of chemically bonding to, or of forming loose associations with, a wide variety of materials, wherein the beads of the second group have a larger average bead diameter that do those of the first group.

* * * * *

UNITED STATES PATENT AND TRADEMARK OFFICE
CERTIFICATE OF CORRECTION

PATENT NO. : 4,609,587

DATED : September 2, 1986

INVENTOR(S) : J.J. Giordano, J.P. Shawcross, A.E. Fuchs and R. Dejaiffe

It is certified that error appears in the above-identified patent and that said Letters Patent is hereby corrected as shown below:

Column 5, line 57, change "trimethoxy" to --dimethyl--;

Column 6, line 6, change "trimethoxy" to --dimethyl--.

Signed and Sealed this

Second Day of February, 1988

Attest:

DONALD J. QUIGG

Attesting Officer

Commissioner of Patents and Trademarks